United States Patent
Smart

[19]

[11] Patent Number: 6,158,301
[45] Date of Patent: *Dec. 12, 2000

[54] GEARSHIFT KNOB COVER

[76] Inventor: Walter Smart, 44 Colgate Rd., Atco, N.J. 08004

[*] Notice: This patent issued on a continued prosecution application filed under 37 CFR 1.53(d), and is subject to the twenty year patent term provisions of 35 U.S.C. 154(a)(2).

[21] Appl. No.: 09/055,152

[22] Filed: Apr. 4, 1998

[51] Int. Cl.[7] .................................................. G05G 1/04
[52] U.S. Cl. .......................... 74/558.5; 74/558; 74/543; 150/154; D12/114
[58] Field of Search ................... 74/558, 558.5, 74/551.9, 543, 563, 557, 608; D12/114; 150/155, 160, 154, 52

[56] References Cited

U.S. PATENT DOCUMENTS

| | | | |
|---|---|---|---|
| D. 341,562 | 11/1993 | Minniefield | D12/114 |
| 619,223 | 2/1899 | Ramey et al. | 150/154 |
| 701,437 | 6/1902 | Wheeler | 74/551.9 |
| 1,356,572 | 10/1920 | Vosburgh | 74/551.9 |
| 1,459,924 | 6/1923 | Obstfeld . | |
| 1,862,964 | 6/1932 | Lilligren | 74/543 |
| 2,449,575 | 9/1948 | Wilhelm | 74/557 |
| 2,776,582 | 1/1957 | Blades | 74/563 |
| 2,997,089 | 8/1961 | Amdur et al. | 150/52 |
| 3,016,763 | 1/1962 | Albert | 74/551 |
| 3,343,578 | 9/1967 | Rubin | 150/52 |
| 3,998,109 | 12/1976 | O'Brien | 74/475 |
| 4,165,659 | 8/1979 | Fawley | 74/558 |
| 4,685,499 | 8/1987 | Black | 150/52 |
| 4,869,305 | 9/1989 | Jones | 150/155 |
| 4,991,457 | 2/1991 | Chen | 74/473 |
| 5,020,390 | 6/1991 | Chang | 74/608 |
| 5,289,735 | 3/1994 | Kato | 74/543 |
| 5,501,120 | 3/1996 | Kikuchi et al. | 74/543 |

FOREIGN PATENT DOCUMENTS 2233239  1/1991  United Kingdom ................... 150/160

Primary Examiner—Vinh T. Luong
Attorney, Agent, or Firm—John H. Scarborough; Robert R. Mallinckrodt

[57] ABSTRACT

A gearshift knob cover for removably attaching to the knob of a floor-mounted gearshift lever with an upper portion fitted snugly over the gearshift knob; and a lower portion connected to the upper portion wrapping around the shaft of a gearshift lever to hold the gearshift knob cover in place.

The upper portion has a soft leather outer covering and an inner backing filled between with padding, typically foam rubber. The lower portion is also typically made of soft leather.

Both the upper portion and the lower portion are provided with openings for gearshift buttons.

The lower portion is provided both with snaps to hold the gearshift knob cover in place and with pockets for pens, pencils, cigarette packages, etc.

12 Claims, 6 Drawing Sheets

GEARSHIFT KNOB COVER

BACKGROUND OF THE INVENTION

1. Field

This invention is in the field of covers for gearshift knobs.

2. State of the Art

Every vehicle has a gearshift knob of some sort. When driving for long distances, particularly in large trucks where frequent shifting is necessary, a driver's hand can get very sore and tired. Truck drivers must constantly shift while driving and their hands may develop calluses, and even develop carpal tunnel syndrome from driving for long periods of time.

There are various gearshift knobs and devices which have been developed in the past, but none are designed to provide for comfort while operating a gearshift for driving long distances.

Some prior art addresses aspects of the gearshift itself. Kato, U.S. Pat. No. 5,289,735, discloses a gearshift knob. O'Brien, U.S. Pat. No. 3,998,109, discloses a transmission shift control lever with a detent release mechanism. Chen, U.S. Pat. No. 4,991,457, discloses a shift boot support with a bezel for floor mounted gearshift levers and enclosures.

Other prior art provide a cushion for the hand for some other applications. Fawley, U.S. Pat. No. 4,165,659, provides a cover for valve wheels of gas cylinders. Obstfeld, U.S. Pat. No. 1,459,924, discloses a cushion cap for a stapling machine. Albert, U.S. Pat. No. 3,016,763, discloses handgrips for handle bars for bicycles; Black, U.S. Pat. No. 4,685,499, provides a cover for steering wheels to prevent effects of overheating from radiation from the sun.

However, none of the prior art provides a means for enhancing the grip on a gearshift knob or a means for providing a more comfortable grip on the gearshift knob itself.

OBJECTS OF THE INVENTION

The objects of this invention are to provide a cover for a gearshift knob to soften the grip, enhance the grip, and to cover sharp edges of a gearshift knob. Other objects are to prevent calluses and to prevent carpal tunnel syndrome. Further, it is an object to provide a cover for a gearshift knob which can be replaced after it becomes worn.

SUMMARY OF THE INVENTION

This invention is a gearshift knob cover which is fitted over a knob of a floor-mounted gearshift lever. The upper portion is fitted over the gearshift knob, and a lower portion, connected to the upper portion, wraps around the gearshift lever to hold the gearshift knob cover in place.

The upper portion is filled with padding. And, the lower portion may be provided with pockets for pens, pencils, cigarette packages, etc.

BRIEF DESCRIPTION OF THE DRAWINGS

The best mode presently contemplated for carrying out the invention in actual practice is shown in the accompanying drawings, in which.

DETAILED DESCRIPTION OF THE ILLUSTRATED EMBODIMENT

Figure 1:
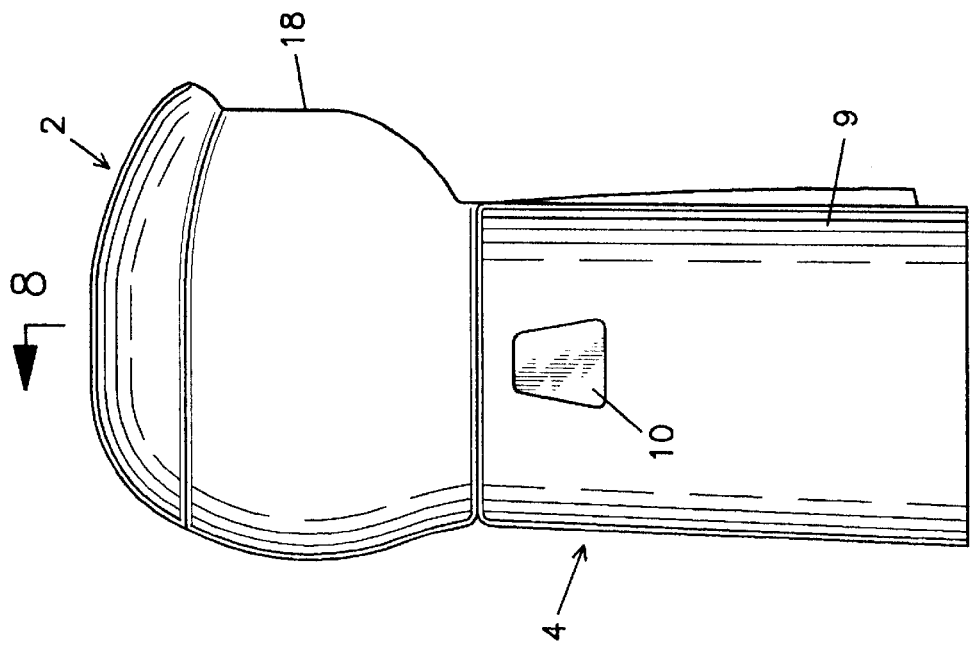
FIG. 1 is a right side elevation of the gearshift knob cover wherein an upper portion covers a gearshift knob on three sides and on top but is left open on the driver's side of the gearshift.
Figure 3:
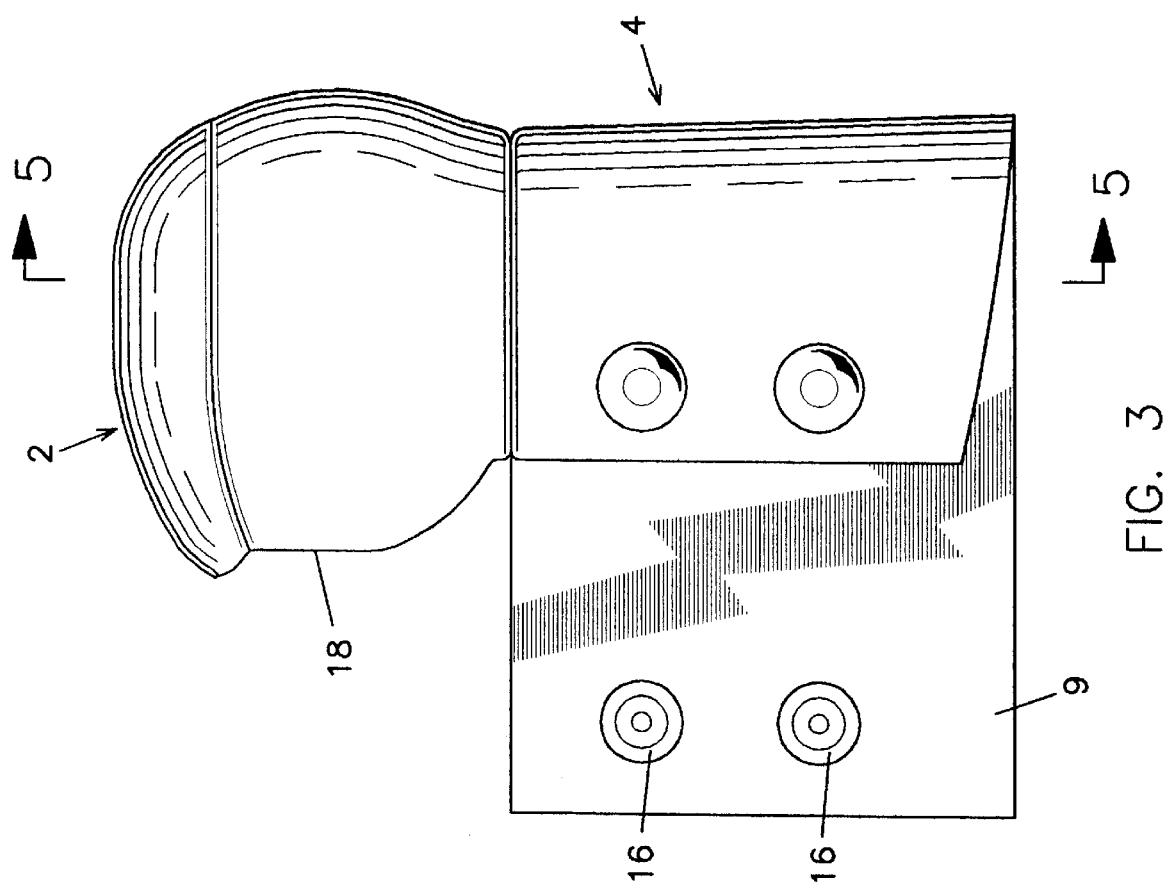
FIG. 3 is a rear elevation of the gearshift knob cover showing a lower portion flap open so the cover can be placed over the gearshift knob.
Figure 5:
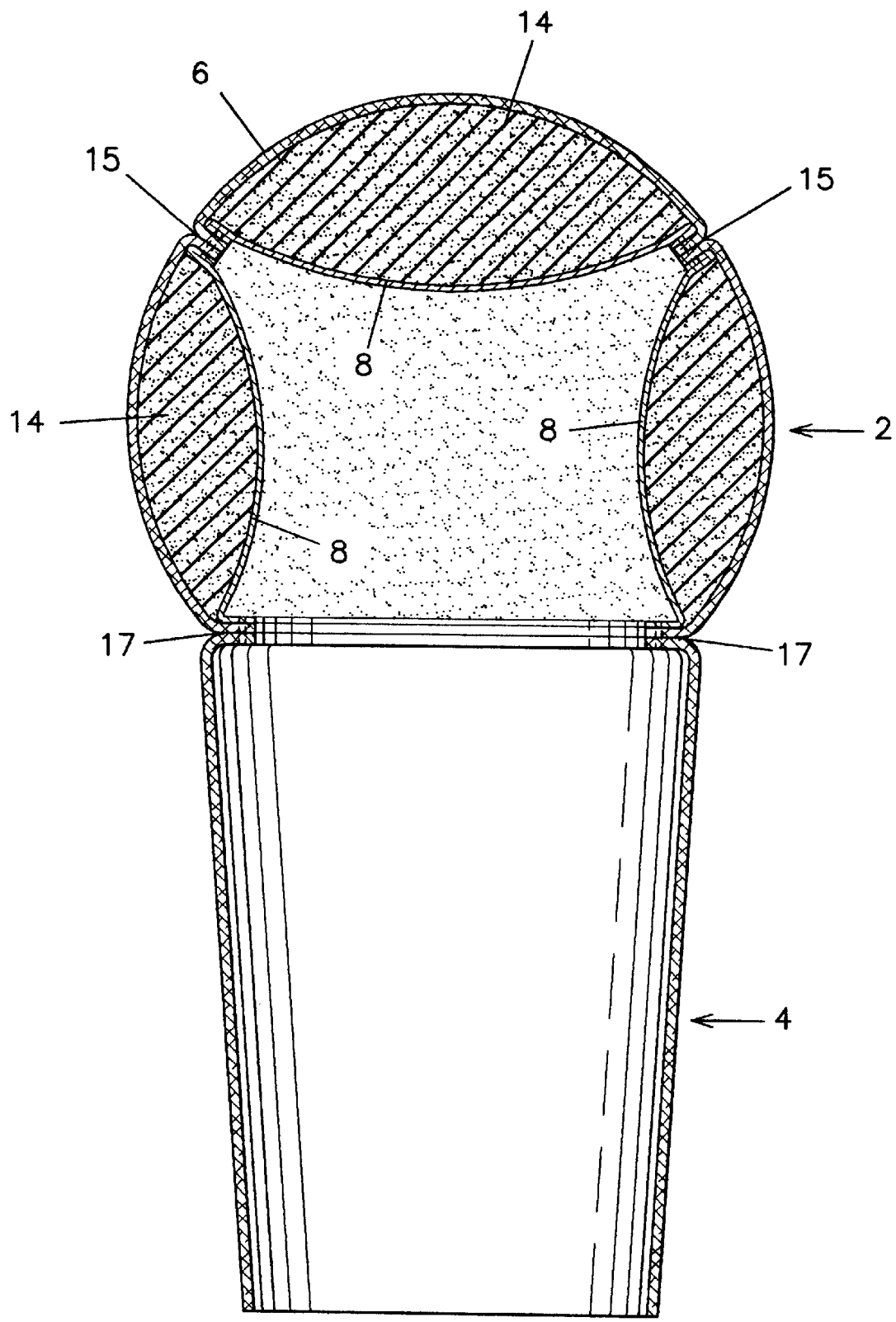
FIG. 5 is a vertical section of the gearshift knob cover taken on line 5—5 of FIG. 3.
Figure 7:
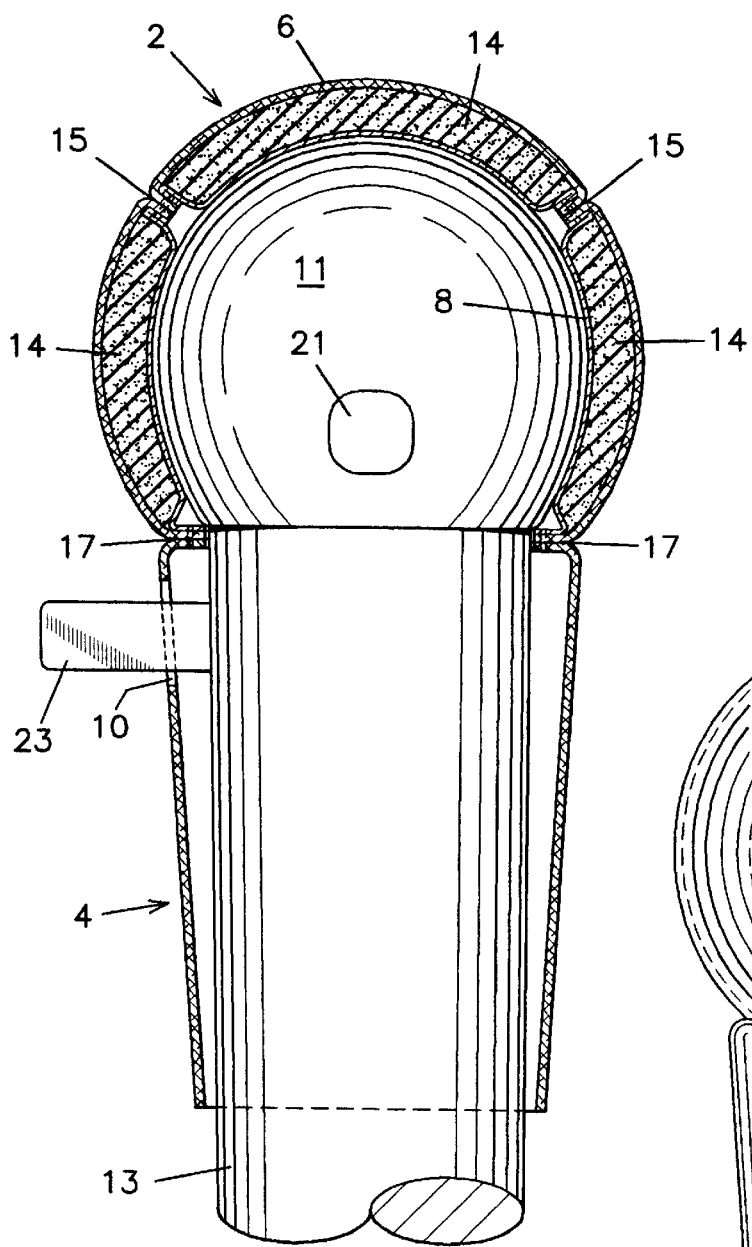
FIG. 7 is a vertical section of the gearshift knob cover similar to that of FIG. 5, but showing the gearshift knob cover mounted on the gearshift knob which is shown in elevation.
Figure 6:
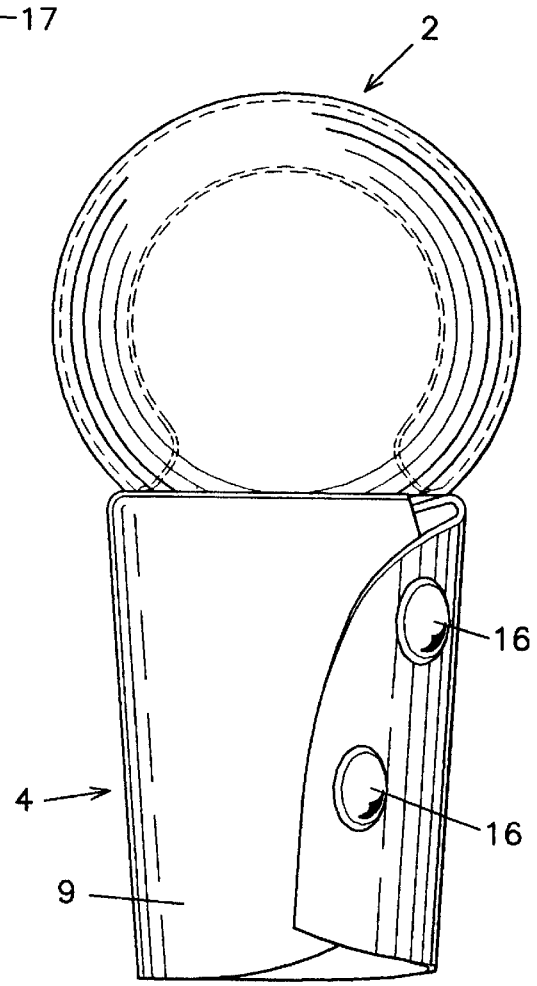
FIG. 6 is a right side elevation of another embodiment of the gearshift knob cover wherein the upper portion completely covers the gearshift knob.
Figure 8:
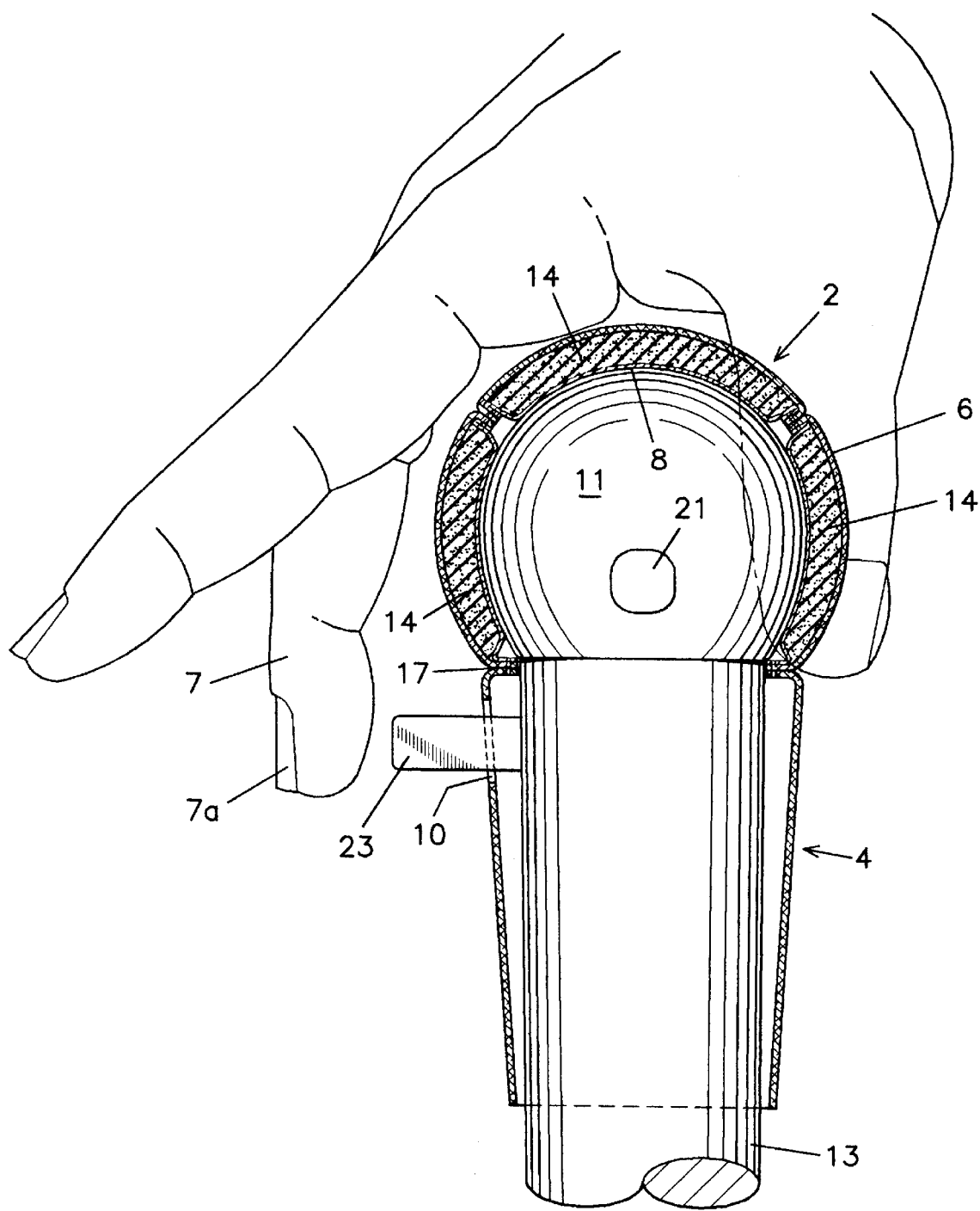
FIG. 8 is a vertical section of the gearshift knob cover taken on line 8—8 of FIG. 2 but showing the gearshift knob cover mounted on the gearshift knob which is shown in elevation and showing schematically a portion of a user's hand grasping the gearshift knob and gearshift cover with the end of the middle finger extending around the front of the cover and knob.

In the illustrated embodiment, the gearshift knob cover is made up of an upper portion 2 and a lower portion 4. The upper portion 2 is made up of 1-inch thick foam rubber padding 14 placed between and filling the space between a soft leather outer covering 6 and an inner backing 8 as shown in FIGS. 1 and 5. The outer covering 6 comes in contact with the driver's hand 7 FIGS. 8 and 9, and the inner backing 8 comes in contact with the gearshift knob 11, secured to the end of gearshift lever 13 as shown in FIGS. 7 and 8. The backing 8 is stitched to the outer covering 6 along seams 15 and 17 which also secure together separate pieces of the leather outer covering as shown in FIG. 5. The foam material 14 is compressed along and toward the seams 15 and 17 as shown in FIGS. 1 and 5. The lower portion 4 includes a flap 9 which can be opened as shown in FIG. 3 to allow the cover to be placed over gearshift knob 11. When over the gearshift knob 11, flap 9 wraps around a gearshift lever 13 with connecting snaps 16 to hold the gearshift knob cover in place as shown in FIGS. 1, 3, and 6. As shown, FIGS. 7, 8, and 9, the gearshift knob 11 is larger than the remainder of the gearshift lever 13. When wrapped around the gearshift lever 13 with flap 9 snapped in place, the gearshift knob 11 cannot pass through the closed lower portion 4. The lower portion 4 which is also made of soft leather is typically sewn to the upper portion 2 around three sides leaving flap 9 free of attachment to the upper portion. The lower portion can be conveniently sewn to the upper portion along seam 17 where the inner backing 8 is sewn to outer covering 6.

Figure 2:
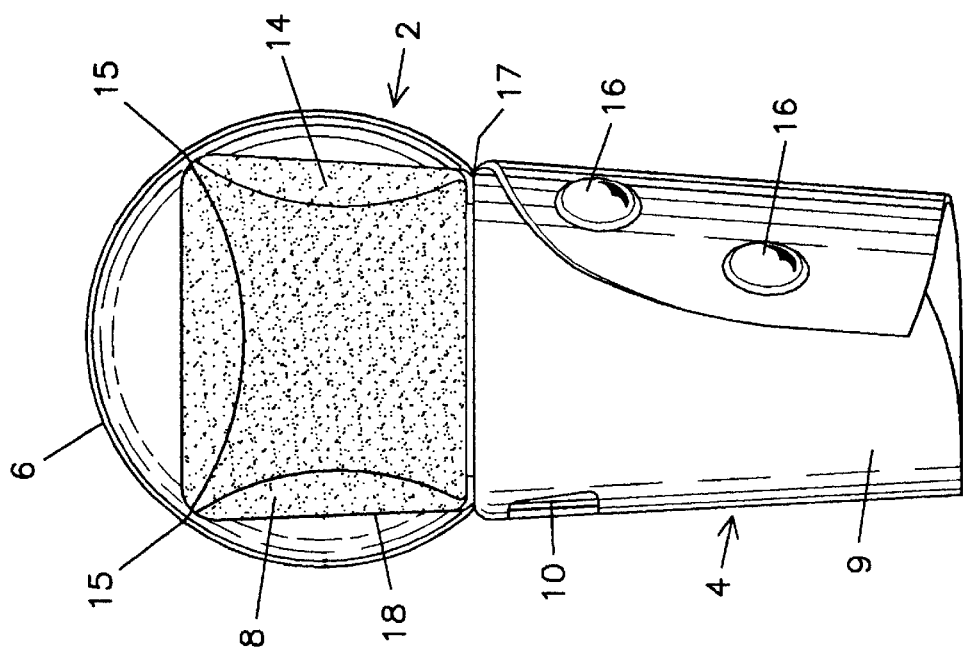
FIG. 2 is a front elevation of the gearshift knob cover.
Figure 9:
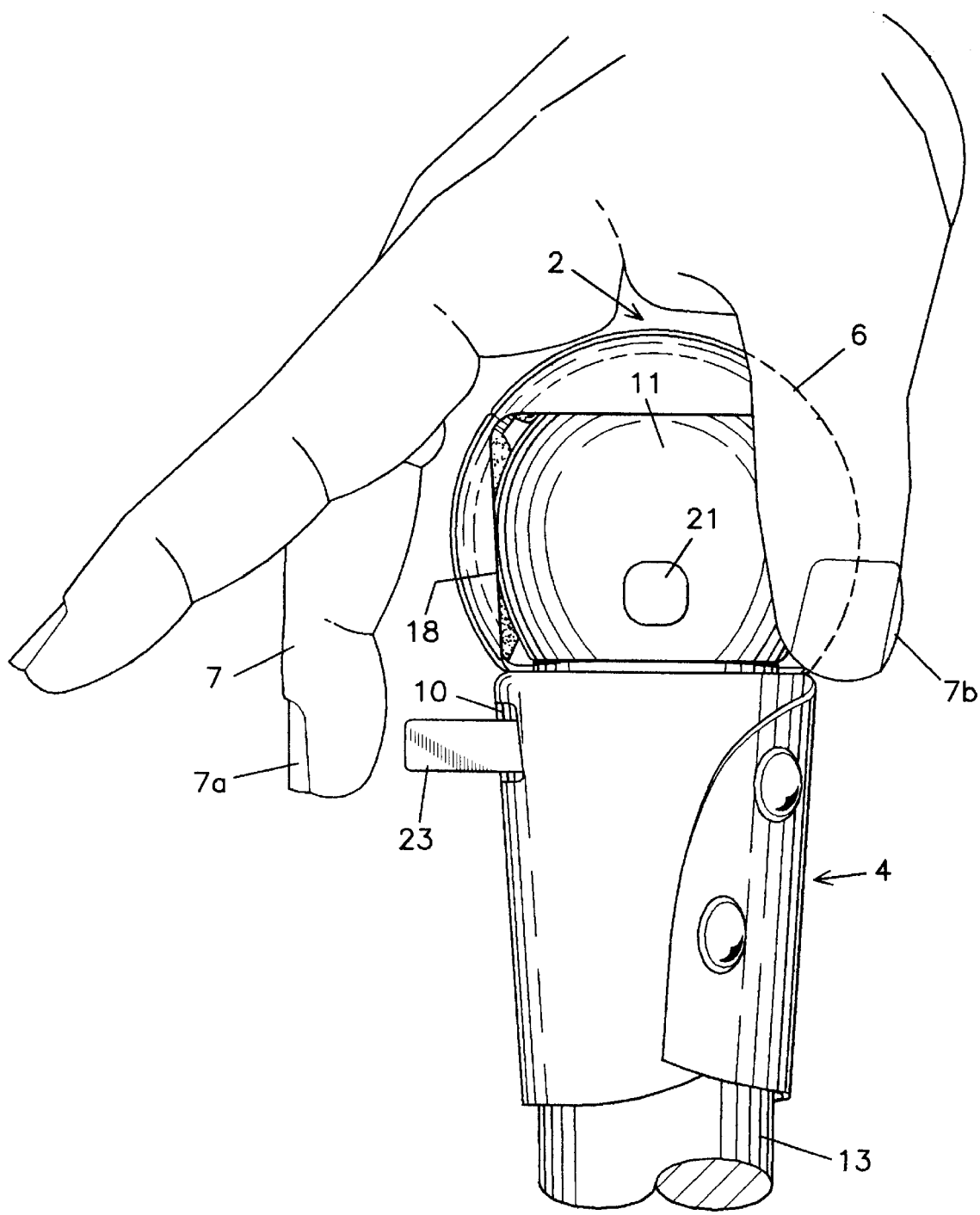
FIG. 9 is a right side elevation similar to that of FIG. 1 but showing schematically a portion of a user's hand grasping the gearshift knob and gearshift cover with the end of the middle finger extending around the front of the cover and knob and the thumb extending down the right side of the gearshift knob.

Many gearshift knobs and gearshift levers, particularly on large trucks, have buttons extending from the knob and from the lower lever for operation by the driver. FIG. 2 shows an opening 10 in the front lower portion 4 for a gearshift button 23, FIGS. 7–9, extending from the front of gearshift lever 13. This gearshift button is positioned for operation by a driver's index finger or middle finger 7a when holding the gearshift knob, and button 23 extends through opening 10 to allow such operation, FIGS. 8, and 9. Similarly, an open area 18, FIGS. 1, 2, and 9, on the right side (driver's side) of the gearshift knob cover allows button 21 to extend therethrough for operation by the driver's thumb 7b as shown in FIG. 9. As shown in FIGS. 7–9, foam 14 is compressed in the knob cover when placed and secured over knob 11 and provides cushioning for the driver's hand holding the gearshift knob.

Figure 4:
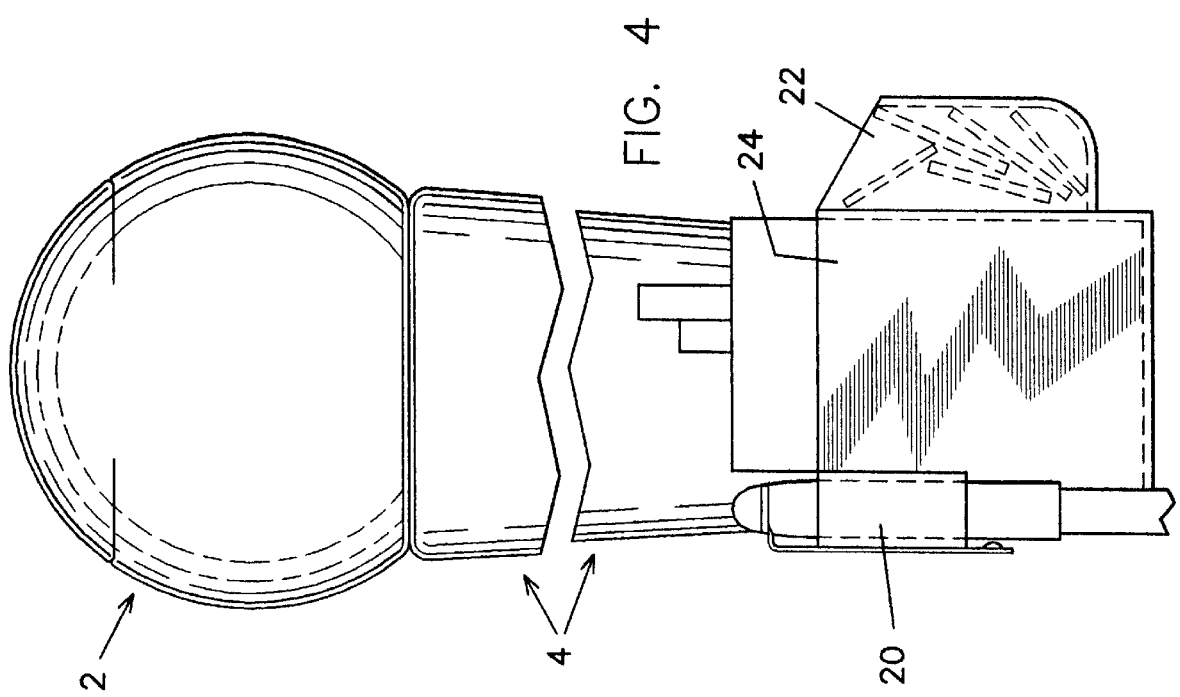
FIG. 4 is a left side elevation of the gearshift knob cover, showing optional pockets attached to the lower portion thereof.

If desired, a sleeve 20 for a pen or pencil, a pouch 22 for coins, and/or a pocket 24 for cigarette packages can be secured to lower portion 4 or to an extended lower portion 4 as shown in FIG. 4. Rather than being mounted directly on lower portion 4, the sleeve, pouch, and/or pocket could be mounted on a detachable lower portion extension to be attached to the lower portion, such as by snaps or hook and loop fastener where desired.

FIG. 6 shows another embodiment of the gearshift knob cover of the invention wherein the upper portion 2 completely covers the gearshift knob. This embodiment is applicable for gearshift knobs which do not have a thumb operated button 21, which was shown in FIG. 1.

While specific constructions and materials for the invention have been disclosed, various materials and constructions could be used. An important aspect of the invention is that the gearshift knob cover is removably secured to the gearshift knob to provide cushioning for a driver's hand while operating the gearshift and to allow the driver to remove and replace the cover when desired. Also, the openings for the gearshift buttons can be located as required to accept various locations of such buttons.

While the present invention has been disclosed in connection with the preferred embodiment thereof, it should be understood that there may be other embodiments which fall within the spirit and scope of the invention as defined by the following claims.

What is claimed is:

1. A gearshift knob cover for removable attachment to a gearshift knob of a floor-mounted gearshift lever, the gearshift lever having the gearshift knob at the top of the gearshift lever and a smaller lower portion beneath the gearshift knob, comprising:

an upper cover portion configured to fit snugly and removably over the gearshift knob when the cover is attached to the gearshift knob, said upper portion including an outer covering, padding material about the inside of the outer covering to provide cushioning around the gearshift knob when the cover is attached to the gearshift knob, and an inner backing spaced inwardly from the outer covering with the padding between the outer covering and inner backing;

a lower cover portion, connected to the upper cover portion, having a flap which can be wrapped and closed around the smaller lower portion of the gearshift lever beneath the gearshift knob to hold the gearshift knob cover in place when closed, and, when opened, enables the gearshift knob cover to be removed from the gearshift knob; and means for releasably holding the flap of the lower cover portion closed when the cover is attached to the gearshift knob, and for opening the flap when desired to remove the cover from the gearshift knob.

2. A gearshift knob cover according to claim 1, wherein the lower portion is provided with means for holding a writing implement.

3. A gearshift knob cover according to claim 1, wherein the lower portion is provided with means for holding coins.

4. A gearshift knob cover according to claim 1, wherein the lower portion is provided with means for holding cigarette packages.

5. A gearshift knob cover for removable attachment to a gearshift knob of a floor-mounted gearshift lever, the gearshift lever having the gearshift knob at the top of the gearshift lever and a smaller lower portion beneath the gearshift knob, comprising:

an upper cover portion configured to fit snugly and removably over the gearshift knob when the cover is attached to the gearshift knob, said upper portion including an outer covering, padding material about the inside of the outer covering to provide cushioning around the gearshift knob when the cover is attached to the gearshift knob, and an opening for a gearshift button extending from the gearshift knob of the gearshift lever;

a lower cover portion, connected to the upper cover portion, having a flap which can be wrapped and closed around the smaller lower portion of the gearshift lever beneath the gearshift knob to hold the gearshift knob cover in place when closed, and, when opened, enables the gearshift knob cover to be removed from the gearshift knob; and means for releasably holding the flap of the lower cover portion closed when the cover is attached to the gearshift knob, and for opening the flap when desired to remove the cover from the gearshift knob.

6. A gearshift knob cover for removable attachment to a gearshift knob of a floor-mounted gearshift lever, the gearshift lever having the gearshift knob at the top of the gearshift lever and a smaller lower portion beneath the gearshift knob, comprising:

an upper cover portion configured to fit snugly and removably over the gearshift knob when the cover is attached to the gearshift knob, said upper portion including an outer covering, padding material about the inside of the outer covering to provide cushioning around the gearshift knob when the cover is attached to the gearshift knob, and is left open on one side leaving access for a gearshift button extending from the gearshift knob of the gearshift lever;

a lower cover portion, connected to the upper cover portion, having a flap which can be wrapped and closed around the smaller lower portion of the gearshift lever beneath the gearshift knob to hold the gearshift knob cover in place when closed, and, when opened, enables the gearshift knob cover to be removed from the gearshift knob; and means for releasably holding the flap of the lower cover portion closed when the cover is attached to the gearshift knob, and for opening the flap when desired to remove the cover from the gearshift knob.

7. A gearshift knob cover for removable attachment to a gearshift knob of a floor-mounted gearshift lever, the gearshift lever having the gearshift knob at the top of the gearshift lever and a smaller lower portion beneath the gearshift knob, comprising:

an upper cover portion configured to fit snugly and removably over the gearshift knob when the cover is attached to the gearshift knob, said upper portion including an outer covering and padding material about the inside of the outer covering to provide cushioning around the gearshift knob when the cover is attached to the gearshift knob;

a lower cover portion, connected to the upper cover portion, having a flap which can be wrapped and closed around the smaller lower portion of the gearshift lever beneath the gearshift knob to hold the gearshift knob cover in place when closed, and, when opened, enables the gearshift knob cover to be removed from the gearshift knob and is provided with an opening for a gearshift button extending from the gearshift lever; and means for releasably holding the flap of the lower cover portion closed when the cover is attached to the gearshift knob, and for opening the flap when desired to remove the cover from the gearshift knob.

8. A gearshift knob cover for removable attachment to a gearshift knob of a floor-mounted gearshift lever, the gearshift lever having the gearshift knob at the top of the gearshift lever and a smaller lower portion beneath the gearshift knob, comprising:

an upper cover portion configured to fit snugly and removably over the gearshift knob when the cover is attached to the gearshift knob, said upper portion including an outer covering and padding material about the inside of the outer covering to provide cushioning around the gearshift knob when the cover is attached to the gearshift knob;

a lower cover portion, connected to the upper cover portion, having a flap which can be wrapped and closed around the smaller lower portion of the gearshift lever beneath the gearshift knob to hold the gearshift knob cover in place when closed, and, when opened, enables the gearshift knob cover to be removed from the gearshift knob; and snaps for releasably holding the flap of the lower cover portion closed when the cover is attached to the gearshift knob, and for opening the flap when desired to remove the cover from the gearshift knob.

9. A gearshift knob cover for removable attachment to a gearshift knob of a floor-mounted gearshift lever having a top and including the gearshift knob at the top of the gearshift lever and a smaller lower portion beneath the gearshift knob, comprising:

an upper cover portion configured to fit snugly and removably over the gearshift knob when the cover is attached to the gearshift knob, said upper cover portion including an outer covering and padding material about the inside of the outer covering to provide cushioning around the gearshift knob when the cover is attached to a gearshift knob; and a lower, openable cover portion, connected to the upper cover portion, configured to be wrapped and closed around the smaller lower portion of the gearshift lever beneath the gearshift knob and, when closed, having an opening therethrough smaller than the gearshift knob to hold the gearshift knob cover in place, said lower cover portion including means for holding auxiliary items therein.

10. A gearshift knob cover according to claim 9, wherein the means for holding auxiliary items is a means for holding a writing implement.

11. A gearshift knob cover according to claim 9, wherein the means for holding an auxiliary items is a means for holding coins.

12. A gearshift knob cover according to claim 9, wherein the means for holding an auxiliary items is a means for holding cigarette packages.

* * * * *